United States Patent
Dusenberry et al.

(10) Patent No.: US 8,206,252 B2
(45) Date of Patent: *Jun. 26, 2012

(54) HYBRID POWERTRAIN HAVING A MULTI-SPEED TRANSMISSION

(75) Inventors: Donald L. Dusenberry, Farmington Hills, MI (US); James B. Borgerson, Clarkston, MI (US); James M. Hart, Belleville, MI (US); Scott H. Wittkopp, Ypsilanti, MI (US); Andrew W. Phillips, Rochester, MI (US); Clinton E. Carey, Highland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 525 days.

This patent is subject to a terminal disclaimer.

(21) Appl. No.: 12/425,633

(22) Filed: Apr. 17, 2009

(65) Prior Publication Data

US 2009/0280941 A1    Nov. 12, 2009

Related U.S. Application Data

(60) Provisional application No. 61/051,762, filed on May 9, 2008.

(51) Int. Cl.
*F16H 3/72* (2006.01)
*F16H 3/44* (2006.01)

(52) U.S. Cl. ............................. 475/5; 475/282; 475/288

(58) Field of Classification Search .............. 475/5, 282, 475/283, 288, 289, 296, 297, 330
See application file for complete search history.

(56) References Cited

U.S. PATENT DOCUMENTS

| | | | |
|---|---|---|---|
| 6,081,042 A * | 6/2000 | Tabata et al. | 290/45 |
| 6,176,803 B1 | 1/2001 | Meyer et al. | |
| 6,558,287 B2 | 5/2003 | Hayabuchi et al. | |
| 6,984,187 B2 | 1/2006 | Biermann | |
| 6,991,578 B2 | 1/2006 | Ziemer | |
| 7,011,597 B2 | 3/2006 | Haka | |
| 7,018,319 B2 | 3/2006 | Ziemer | |
| 7,101,305 B2 | 9/2006 | Tabata et al. | |
| 7,163,484 B2 | 1/2007 | Klemen | |
| 7,699,741 B2 * | 4/2010 | Hart et al. | 475/271 |
| 7,736,264 B2 * | 6/2010 | Moorman et al. | 475/277 |
| 7,775,931 B2 * | 8/2010 | Carey et al. | 475/276 |
| 7,828,096 B2 * | 11/2010 | Hoher et al. | 180/65.6 |
| 8,012,059 B2 * | 9/2011 | Borgerson | 475/283 |
| 2005/0090362 A1 | 4/2005 | Abe et al. | |
| 2006/0270513 A1 | 11/2006 | Klemen | |
| 2006/0270516 A1 | 11/2006 | Klemen | |
| 2008/0011529 A1 * | 1/2008 | Hoher et al. | 180/65.2 |
| 2008/0227587 A1 * | 9/2008 | Carey et al. | 475/283 |
| 2009/0209390 A1 * | 8/2009 | Carey et al. | 475/282 |
| 2009/0209391 A1 * | 8/2009 | Carey et al. | 475/282 |
| 2009/0264238 A1 | 10/2009 | Carey et al. | |
| 2009/0305838 A1 | 12/2009 | Borgerson et al. | |

FOREIGN PATENT DOCUMENTS

DE    102005032001 A1    2/2007

* cited by examiner

*Primary Examiner* — Roger Pang

(57) ABSTRACT

A hybrid powertrain includes an internal combustion engine, at least one electric machine and a multi-speed transmission. The electric machine is connected to a shaft between the internal combustion engine and the multi-speed transmission. The transmission is provided having an input member, an output member, four planetary gear sets, a plurality of coupling members and a plurality of torque transmitting devices. Each of the planetary gear sets includes a sun gear member, a planet carrier member, and a ring gear member. The torque transmitting devices include clutches and brakes arranged within a transmission housing.

16 Claims, 4 Drawing Sheets

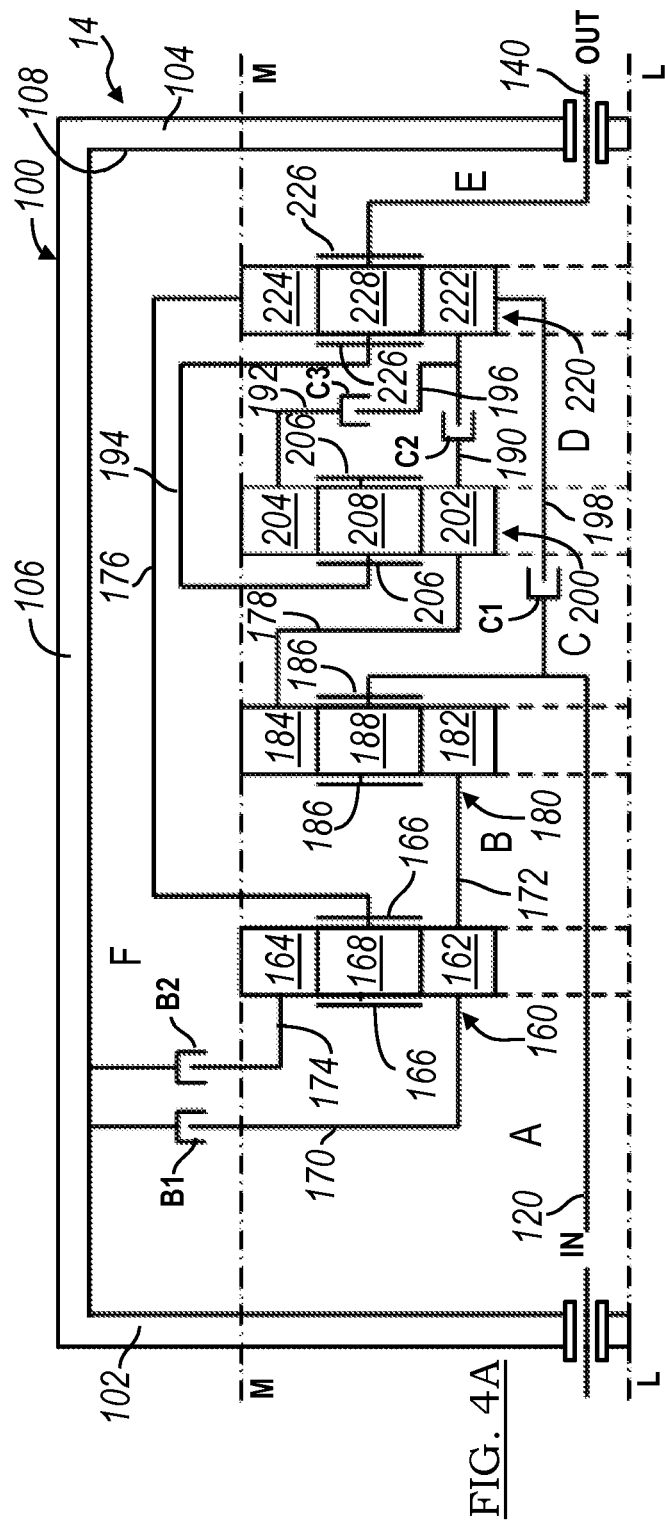

HYBRID POWERTRAIN HAVING A MULTI-SPEED TRANSMISSION

CROSS-REFERENCE TO RELATED APPLICATIONS

This application claims the benefit of U.S. Provisional Application No. 61/051,762, filed on May 9, 2008, which is hereby incorporated in its entirety herein by reference.

FIELD

The invention relates generally to a hybrid powertrain having an internal combustion engine, an electric machine and a multiple speed transmission including a plurality of planetary gear sets and a plurality of torque transmitting devices and more particularly to a hybrid powertrain having multiple speed transmission for generating eight or more speeds, four planetary gear sets and a plurality of torque transmitting devices.

BACKGROUND

The statements in this section merely provide background information related to the present disclosure and may or may not constitute prior art.

A typical hybrid powertrain includes an internal combustion engine, an electric machine or motor and a transmission. The transmission uses a combination of a plurality of torque transmitting mechanisms, planetary gear arrangements and fixed interconnections to achieve a plurality of gear ratios. The number and physical arrangement of the planetary gear sets, generally, are dictated by packaging, cost and desired speed ratios. The torque generated by either the internal combustion engine or the electric motor must be separately transmitted to the transmission. Moreover, when either the internal combustion engine or the electric machine is transmitting torque to the transmission a hydraulic pump is activated to generate oil pressure to control the torque transmitting mechanisms and other hydraulically operated devices of the transmission.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact hybrid powertrain.

SUMMARY

A hybrid powertrain is provided having an internal combustion engine, an electric machine or motor and a multi-speed transmission. The electric motor of the hybrid powertrain is connected to a shaft between an internal combustion engine and the multi-speed transmission. The transmission is provided having a transmission input member, a transmission output member, a plurality of planetary gear sets, and a plurality of torque-transmitting mechanisms. The plurality of planetary gear sets each have a sun gear member, a planetary carrier member and a ring gear member.

In one aspect of the present invention, the plurality of planetary gear sets includes four planetary gear sets.

In another aspect of the present invention, two of the plurality of torque transmitting mechanisms are brakes.

In another aspect of the present invention, three of the torque transmitting mechanisms are friction clutches.

In another aspect of the present invention, the electric machine is connected to the transmission input member between the internal combustion engine and the transmission.

In another aspect of the present invention, a hydraulic pump is connected to the transmission input member for generating oil pressure to control an operation of the transmission.

In another aspect of the present invention, an input member clutch for selectively coupling an engine output shaft of the internal combustion engine with the transmission input member.

In another aspect of the present invention, further comprising a torsional vibration damper connected to the engine output shaft for reducing vibration in the engine output shaft.

In another aspect of the present invention, at least one torque sensor is coupled to at least one of an engine output shaft, the transmission input shaft and the transmission output shaft for controlling torque transmission.

In another aspect of the present invention, the hydraulic pump is coupled to the transmission input member through a free-wheel clutch.

In another aspect of the present invention, a second electric machine is rotationally coupled to the hydraulic pump to supply rotational energy to operate the hydraulic pump.

In another aspect of the present invention, a torque converter is disposed between the electric machine and the transmission for transmitting torque generated by one of the engine and the electric machine to the transmission input shaft and a hydraulic pump is coupled to the torque converter for receiving rotational energy from the torque converter to generate oil pressure to control an operation of the transmission.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 4A is a schematic diagram of a gear arrangement for a multi-speed transmission, according to the principles of the present invention; and FIG. 4B is a schematic showing the locations of the torque transmitting devices for the arrangement of planetary gear sets of the transmission shown in FIG. 4A, in accordance with the embodiments of the present invention.

DETAILED DESCRIPTION

The following description is merely exemplary in nature and is not intended to limit the present disclosure, application, or uses.

Figure 1:
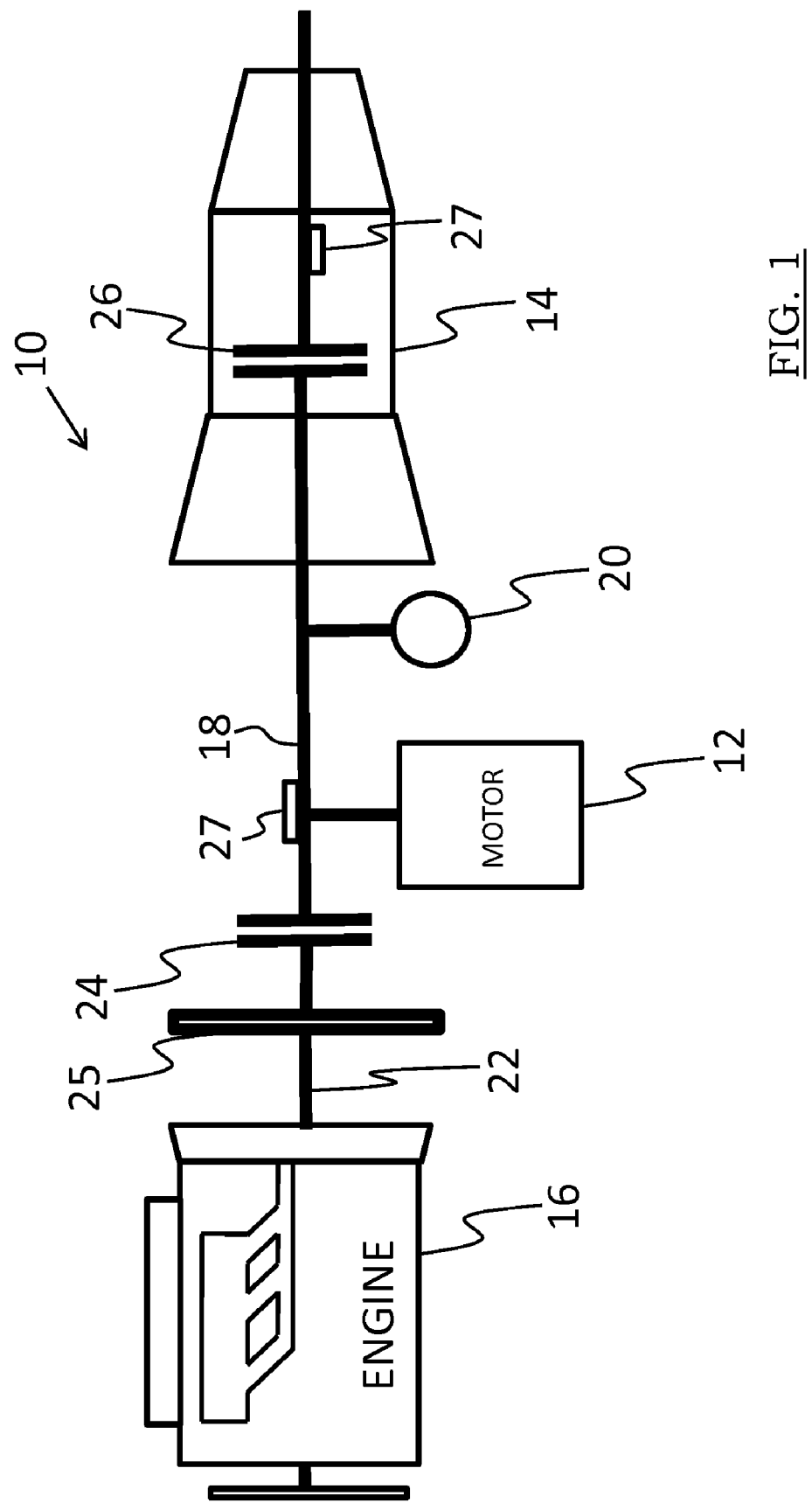
FIG. 1 is a schematic diagram of a hybrid powertrain, according to the principles of the present invention.
Figure 2:
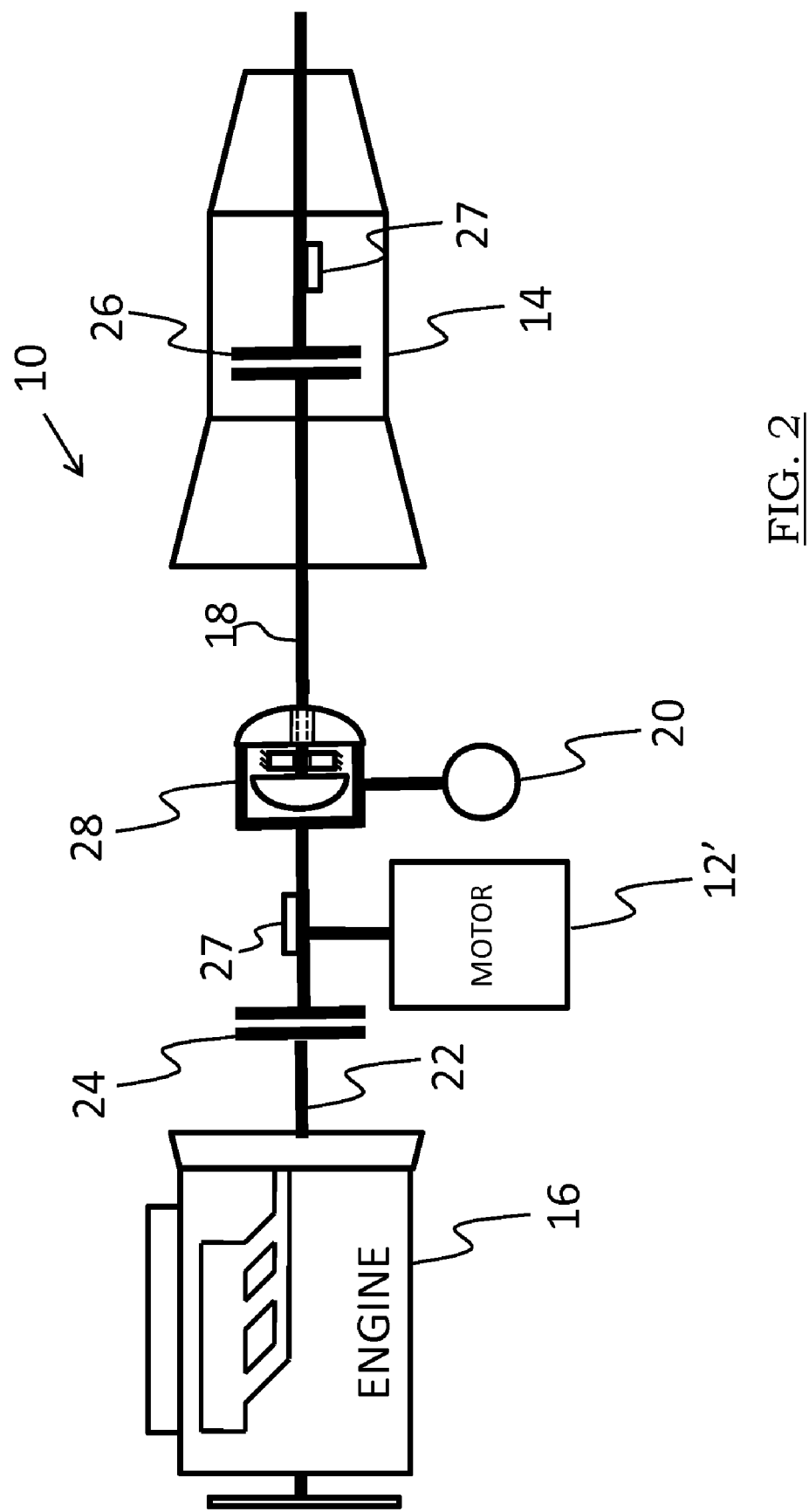
FIG. 2 is a schematic diagram of another embodiment of a hybrid powertrain, according to the principles of the present invention.
Figure 3:
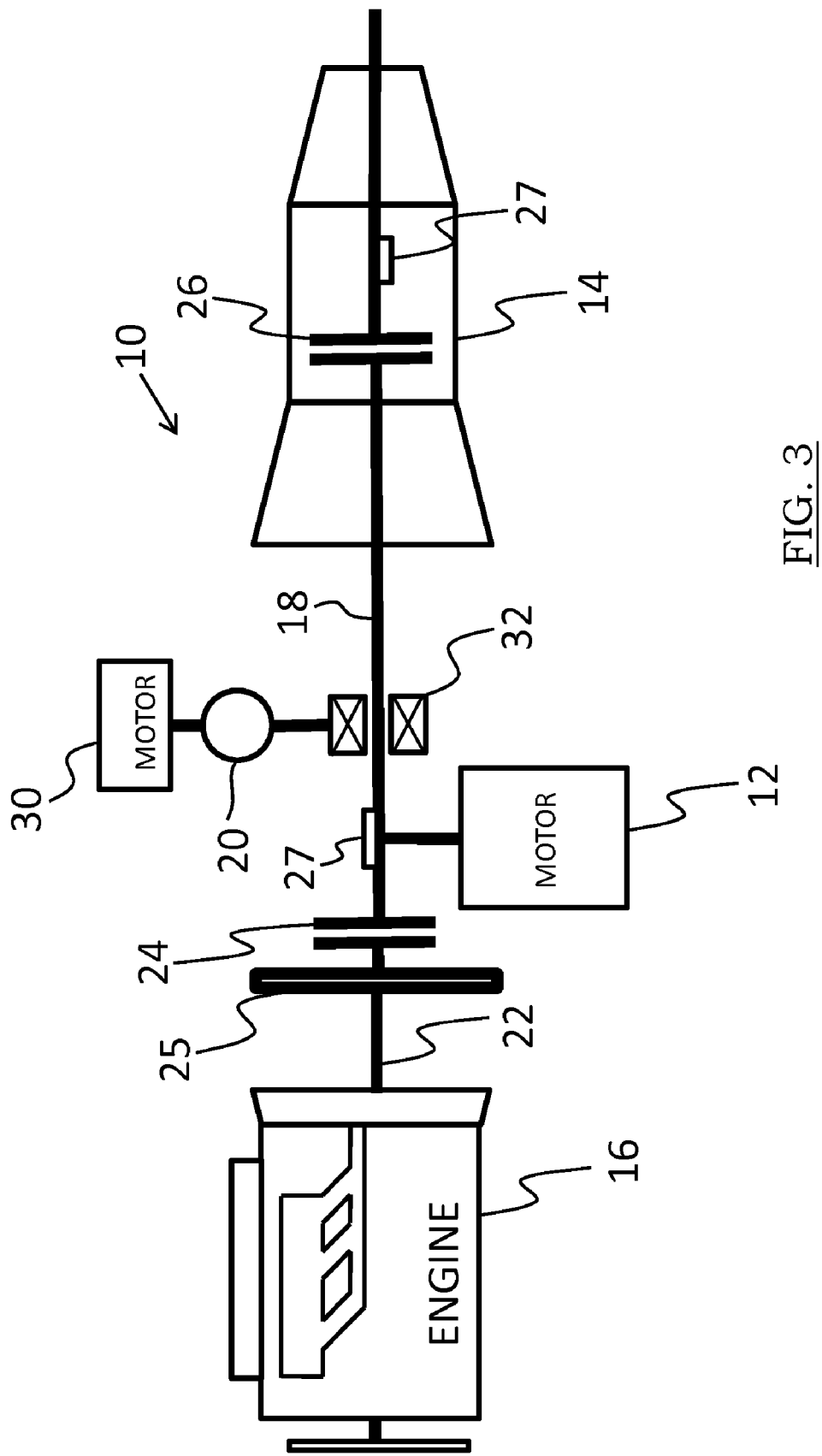
FIG. 3 is a schematic diagram of another embodiment of a hybrid powertrain, according to the principles of the present invention.

Referring now to FIGS. 1 to 3 embodiments of a hybrid powertrain 10 are illustrated. The hybrid powertrain 10 includes a first electric motor 12, a multi-speed vehicle transmission 14 and an internal combustion engine 16. First electric motor 12 is permanently connected to an input shaft or member 18 of the vehicle transmission 14. First electric motor 12 is arranged between the internal combustion engine 16 and vehicle transmission 14. Vehicle transmission 14 has a changeable gear ratio and at least eight gear speeds which will be described in further detail hereinafter. The first electric machine 12 can be operated as an engine for driving the motor vehicle and as a generator for charging the batteries. A hydraulic pump 20 is provided, in addition, for operation and control of the vehicle transmission 14. Hydraulic pump 20 is a binary pump that reduces pump losses in transmission 14 and therefore improves fuel economy.

The engine output shaft or member 22 of the internal combustion engine 16 is connected, via a first clutch device 24, to the input shaft 18 of the vehicle transmission 14, so that the internal combustion engine 16 is separated from the input shaft 18 of the vehicle transmission 14 when the clutch device 24 is disengaged. In addition, a second clutch device 26 is provided on the input shaft 18 and is a clutch or brake of the vehicle transmission 14 and may be activated by electrically applied actuators. First and second clutch devices 24, 26 are friction clutches, synchronizing clutches or brakes or similar devices. In order to reduce vibration that may be transferred by the internal combustion engine 16, a torsional vibration damper 25 can be arranged in the powertrain 10 between the internal combustion engine 16 and the vehicle transmission 14. As a torsional vibration damper 25, for example, a dual mass flywheel with a first mass as primary mass and a second mass as secondary mass, can be used but also any other suitable damping element is possible. The torsional vibration damper can be connected indirectly, but also directly, via a so-called drive plate, to the crankshaft of the internal combustion engine in the proposed hybrid powertrain 10. Moreover, the present invention contemplates the use of torque sensors 27 attached to any of the shafts of powertrain 10 and transmission 14 to improve shift feel.

In the first exemplary embodiment of the hybrid powertrain 10, as shown in FIG. 1, the hydraulic pump 20 is fixedly connected to the input shaft 18 of the vehicle transmission 14 and thus also to the first electric machine 12. The hydraulic pump 20 is configured to generate the required oil pressure to control and adjust various components of the vehicle transmission 14.

The present invention contemplates a starting procedure for the hybrid powertrain 10 shown in FIG. 1. First the first electric machine or motor 12 is started and brought to a rotational speed at which sufficient oil pressure is generated by the hydraulic pump 20 to engage the first clutch device 24 or the second clutch device 26 for driving the vehicle transmission 14. Additionally, the starting procedure includes when appropriate allowing the second clutch device 26 in the vehicle transmission 14 to slip as the first electric machine 12 rotates input shaft 18. Accordingly, a thermally more robust design of the second clutch device 26 is required, unless the first clutch device 24 is designed as a startup clutch.

For example, during an uphill climb, it is possible that the first electric machine 12 is not sufficient to drive the vehicle. In this case, the internal combustion engine 16 can be started before the energy stores of the batteries are entirely emptied.

Another embodiment is shown in FIG. 2. In this exemplary embodiment, the hydraulic pump 20 is connected to a torque converter 28. In this way, the hydraulic pump 20 is driven by means of the torque converter 28, which is connected to the input shaft 18 of the vehicle transmission 14. In contrast with the other exemplary embodiments, the electric machine or motor is designed herein as a crankshaft starter generator 12'.

In FIG. 3 a third exemplary embodiment of the hybrid drive is shown. In this embodiment, the required oil pressure for the electric startup is generated by means of a smaller second electric machine 30. The second electric machine 30 is connected in a rotationally fixed manner to the hydraulic pump 20 of the vehicle transmission 14. The hydraulic pump 20 is connected, in turn, via a free-wheel clutch 32, to the input shaft 18 of the vehicle transmission 14.

The hydraulic pump 20 can be driven, via the second electric machine 30, during an electric startup. As soon as the internal combustion engine 16 is activated or the rotational speed of the first electric machine 12 is greater than the rotational speed of the second electric machine 30, the second electric machine 30 can be deactivated. This is possible because the hydraulic pump 20 is driven, via the engaged free-wheel clutch 32 by the internal combustion engine 16 or the first electric machine 12.

In this exemplary embodiment, it is advantageous that the oil pressure sufficient for controlling and adjusting the vehicle transmission 14 is built up before driving the vehicle by means of the second electric machine 30. In this starting arrangement, the internal clutch or brake of the multi-speed transmission 14 is engaged. The starting procedure is carried out exclusively via the first electric machine 12. If the energy supply of the first electric machine 12 is insufficient, the internal combustion engine 16 is started, which is started with the first electric machine 12 by engaging the first clutch device 24. With very strong accelerations, the driving force of the internal combustion engine 16 and the first electric machine 12, are combined, via the first clutch device 24.

Referring now to FIG. 4A, an embodiment of the multi-speed transmission 14 is shown. The transmission 14 is illustrated as a rear-wheel drive or longitudinal transmission, though various other types of transmission configurations may be employed. The transmission 14 includes a transmission housing 100, an input shaft or member 120, and an output shaft or member 140. The input member 120 is continuously connected to an engine (not shown) or to a turbine of a torque converter (not shown). The output member 140 is continuously connected with a final drive unit (not shown) or transfer case (not shown).

The transmission 14 includes a first planetary gear set 160, a second planetary gear set 180, a third planetary gear set 200, and a fourth planetary gear set 220. The planetary gear sets 160, 180, 200 and 220 are connected between the input member 120 and the output member 140. In a preferred embodiment of the present invention, the planetary gear set 160 includes a sun gear member 162, a ring gear member 164, and a planet carrier member 166 that rotatably supports a set of planet or pinion gears 168 (only one of which is shown). The pinion gears 168 are each configured to intermesh with both the sun gear member 162 and the ring gear member 164. The sun gear member 162 is connected for common rotation with a first shaft or intermediate member 170 and a second shaft or intermediate member 172. It should be appreciated that the first intermediate member 170 is connected for common rotation with the second intermediate member 172 and that the intermediate members 170 and 172 may form one single shaft or multiple shafts through one or more members of the planetary gear sets, as seen throughout the several views. The ring gear member 164 is connected for common rotation with a third shaft or intermediate member 174. The planet carrier member 166 is connected for common rotation with a fourth shaft or intermediate member 176.

The planetary gear set 180 includes a sun gear member 182, a ring gear member 184, and a planet carrier member 186 that rotatably supports a set of planet or pinion gears 188. The pinion gears 188 are each configured to intermesh with both the sun gear member 182 and the ring gear member 184. The sun gear member 182 is connected for common rotation with the second intermediate member 172. The ring gear member 184 is connected for common rotation with a fifth shaft or intermediate member 178. The planet carrier member 186 is connected for common rotation with the input member 120.

The planetary gear set 200 includes a sun gear member 202, a ring gear member 204, and a carrier member 206 that rotatably supports a set of planet or pinion gears 208. The pinion gears 208 are each configured to intermesh with both the sun gear member 202 and the ring gear member 204. The sun gear member 202 is connected for common rotation with the fifth shaft or intermediate member 178 and with a sixth shaft or intermediate member 190. It should be appreciated that the fifth intermediate member 178 is connected for common rotation with the sixth intermediate member 190 and that the intermediate members 178 and 190 may form one single shaft or multiple shafts through one or more members of the planetary gear sets, as seen throughout the several views. The ring gear member 204 is connected for common rotation with a seventh shaft or intermediate member 192. The planet carrier member 206 is connected for common rotation with an eighth shaft or intermediate member 194. It should be appreciated that the eighth intermediate member 194 is connected for common rotation with the output member 140 and that the eighth intermediate members 194 and the output member 140 may form one single shaft or multiple shafts through one or more members of the planetary gear sets, as seen throughout the several views.

The planetary gear set 220 includes a sun gear member 222, a ring gear member 224, and a planet carrier member 226 that rotatably supports a set of planet or pinion gears 228. The pinion gears 228 are each configured to intermesh with both the sun gear member 222 and the ring gear member 224. The sun gear member 222 is connected for common rotation with a ninth shaft or intermediate member 196 and a tenth shaft or intermediate member 198. It should be appreciated that the ninth intermediate member 196 is connected for common rotation with the tenth intermediate member 198 and that the intermediate members 196 and 198 may form one single shaft or multiple shafts through one or more members of the planetary gear sets, as seen throughout the several views. The ring gear member 224 is connected for common rotation with the fourth intermediate member 176. The planet carrier member 226 is connected for common rotation with the output member 140 and with the eighth intermediate member 194.

The transmission 14 includes a variety of torque-transmitting mechanisms or devices including a first clutch C1, a second clutch C2, a third clutch C3, a first brake B1 and a second brake B2. The first clutch C1 is selectively engagable to connect the input member 120 to the tenth intermediate member 198. The second clutch C2 is selectively engagable to connect the sixth intermediate member 190 to the ninth intermediate member 196. The third intermediate clutch C3 is selectively engagable to connect the seventh intermediate member 192 to the ninth intermediate member 196. The first brake B1 is selectively engagable to connect the first intermediate member 170 to the transmission housing 100 to restrict rotation of the first intermediate member 170 relative to the transmission housing 100. Finally, the second brake B2 is selectively engagable to connect the third intermediate member 174 to the transmission housing 100 to restrict rotation of the third intermediate member 174 relative to the transmission housing 100.

The transmission 14 is capable of transmitting torque from the input member 120 to the output member 140 in at least eight forward torque ratios and one reverse torque ratio. Each of the forward torque ratios and the reverse torque ratio are attained by engagement of one or more of the torque-transmitting mechanisms (i.e. first intermediate clutch C1, second intermediate clutch C2, third intermediate clutch C3, firs brake B1 and second brake B2). Those skilled in the art will readily understand that a different speed ratio is associated with each torque ratio. Thus, eight forward speed ratios may be attained by the transmission 14.

The transmission housing 100 includes a first end wall 102, a second end wall 104, and a third wall 106. The third wall 106 interconnects between the first and second end walls 102 and 104 to provide a space or cavity 108 in which planetary gear sets 160, 180, 200, and 220 and the torque-transmitting mechanisms C1, C2, C3, B1, and B2 are located. Further, the cavity 108 has a plurality of areas or Zones A, B, C, D, E, and F in which the plurality of torque transmitting mechanisms C1, C2, C3, B1, and B2 will be specifically positioned, in accordance with the preferred embodiments of the present invention.

As shown in FIG. 4A, Zone A is defined by the area or space bounded: axially on the left by the first end wall 102, on the right by planetary gear set 160, radially inward by a reference line "L" which is a longitudinal line that is axially aligned with the input shaft 120, and radially outward by a reference line "M" which is a longitudinal line that extends adjacent an outer diameter or outer periphery of the planetary gear sets 160, 180, 200, and 220. While reference line "M" is illustrated as a straight line, it should be appreciated that reference line "M" follows the outer periphery of the planetary gear sets 160, 180, 200, and 220, and accordingly may be stepped or non-linear depending on the location of the outer periphery of each of the planetary gear sets 160, 180, 200, and 220. Zone B is defined by the area bounded: axially on the left by planetary gear set 160, axially on the right by the planetary gear set 180, radially outward by reference line "M", and radially inward by reference line "L". Zone C is defined by the area bounded: axially on the left by the planetary gear set 180, axially on the right by the planetary gear set 200, radially outward by reference line "M", and radially inward by reference line "L". Zone D is defined by the area bounded: axially on the left by the planetary gear set 200, axially on the right by the planetary gear set 220, radially outward by reference line "M", and radially inward by reference line "L". Zone E is defined by the area bounded: axially on the left by the planetary gear set 220, axially on the right by the second end wall 104, radially outward by reference line "M", and radially inward by reference line "L". Zone F is defined by the area bounded: axially on the left by the first end wall 102, axially on the right by the second end wall 104, radially inward by reference line "M" and radially outward by the third wall 106. As will be described and illustrated hereinafter, planetary gear sets 160, 180, 200, and 220 will change positions within the transmission cavity 108, however, the Zones described above will not change and will remain the same as shown throughout the Figures.

In the arrangement of the transmission 14 shown in FIG. 4A, the planetary gear sets 160, 180, 200, and 220 are longitudinally arranged in the following order from left to right: 160-180-200-220. Specifically, the planetary gear set 160 is disposed closest to the wall 102, the planetary gear set 220 is disposed closest to the wall 104, the planetary gear set 180 is adjacent the planetary gear set 160, and the planetary gear set 200 is disposed between the planetary gear sets 180 and 220. The torque-transmitting mechanisms are intentionally located within specific Zones in order to provide advantages in overall transmission size, packaging efficiency, and reduced manufacturing complexity. In the particular example shown in FIG. 4A, the torque-transmitting mechanism C1 is disposed within Zone C, the torque-transmitting mechanisms C2 and C3 are disposed within Zone D, and the torque-transmitting mechanisms B1 and B2 are disposed within Zone F.

However, the present invention contemplates other embodiments where the torque-transmitting mechanisms C1, C2, C3, B1, and B2 are disposed in the other Zones. The feasible locations of the torque-transmitting devices C1, C2, C3, B1, and B2 relative to the Zones are illustrated in the chart shown in FIG. 4B. An "X" in the chart indicates that the present invention contemplates locating the particular torque-transmitting device in any of the referenced Zones.

The description of the invention is merely exemplary in nature and variations that do not depart from the gist of the invention are intended to be within the scope of the invention. Such variations are not to be regarded as a departure from the spirit and scope of the invention.

The invention claimed is:

1. A hybrid powertrain comprising:
    an internal combustion engine;
    a transmission having:
        a transmission input member
        a transmission output member;
        a first, second, third and fourth planetary gear set each planetary gear set having a sun gear member, a ring gear member and a planet carrier member supporting a plurality of planet gears each configured to intermesh with both the sun gear member and the ring gear member, wherein the transmission input member is continuously interconnected with the planet carrier member of the second planetary gear set, and the transmission output member is continuously interconnected with the planet carrier member of the fourth planetary gear set and the planet carrier member of the third planetary gear set, and wherein the sun gear member of the first planetary gear set is continuously interconnected with the sun gear member of the second planetary gear set, the ring gear member of the second planetary gear set is continuously interconnected with the sun gear member of the third planetary gear set, the planet carrier member of the first planetary gear set is continuously interconnected with the ring gear member of the fourth planetary gear set;
        a first clutch selectively engageable to interconnect the sun gear member of the fourth planetary gear set to the planet carrier member of the second planetary gear set and the transmission input member;
        a second clutch selectively engageable to interconnect the sun gear member of the fourth planetary gear set to the sun gear member of the third planetary gear set and the ring gear member of the second planetary gear set;
        a third clutch selectively engageable to interconnect the sun gear member of the fourth planetary gear set to the ring gear member of the third planetary gear set;
        a first brake selectively engageable to interconnect the sun gear member of the first planetary gear set and the sun gear member of the second planetary gear set to the transmission housing;
        a second brake selectively engageable to interconnect the ring gear member of the first planetary gear set to the transmission housing; and
        wherein the clutches and brakes are selectively engageable to establish at least eight forward speed ratios and at least one reverse speed ratio between the transmission input member and the transmission output member;
    a first electric machine connected to the transmission input member between the internal combustion engine and the transmission;
    a hydraulic pump connected to the transmission input member for generating oil pressure to control an operation of the transmission; and
    an input member clutch for selectively coupling an engine output shaft of the internal combustion engine with the transmission input member.

2. The hybrid powertrain of claim 1 wherein the transmission further comprises a transmission housing having a first wall, a second wall, and a third wall extending between the first and second walls and wherein the first planetary gear set is adjacent the first wall, the second planetary gear set is adjacent the first planetary gear set, the fourth planetary gear set is adjacent the second wall, and the third planetary gear set is between the second and fourth planetary gear sets.

3. The hybrid powertrain of claim 2 wherein the transmission housing further comprises a first area defined radially inward from an outer periphery of the planetary gear sets and axially bounded by the first wall and the first planetary gear set, a second area defined radially inward from the outer periphery of the planetary gear sets and axially bounded by the first and second planetary gear sets, a third area defined radially inward from the outer periphery of the planetary gear sets and axially bounded by the second and third planetary gear sets, a fourth area defined radially inward from the outer periphery of the planetary gear sets and axially bounded by the third and fourth planetary gear sets, a fifth area defined radially inward from the outer periphery of the planetary gear sets and axially bounded by the fourth planetary gear set and the second wall, and a sixth area defined radially inward from the third wall and radially outward from the outer periphery of the planetary gear sets and axially bounded by the first wall and the second wall.

4. The hybrid powertrain of claim 3 wherein the first clutch is located in at least one of the third, fourth, and fifth areas, the second clutch is located in the fourth area, the third clutch is located in at least one of the fourth and sixth areas, the first brake is located in at least one of the first, fifth, and sixth areas, and the second brake is located in at least one of the first, fifth, and sixth areas.

5. The hybrid powertrain of claim 3 wherein the first clutch is located in the third area, the second clutch is located in the fourth area, the third clutch is located in the fourth area, the first brake is located in the sixth area and the second brake is located in the sixth area.

6. The hybrid powertrain of claim 1 further comprising a torsional vibration damper connected to the engine output shaft for reducing vibration in the engine output shaft.

7. The hybrid powertrain of claim 1 further comprising at least one torque sensor coupled to at least one of the engine output shaft, the transmission input shaft and the transmission output shaft for controlling torque transmission.

8. The hybrid powertrain of claim 1 wherein the hydraulic pump is coupled to the transmission input member through a free-wheel clutch.

9. The hybrid powertrain of claim 8 further comprising a second electric machine rotationally coupled to the hydraulic pump for supplying rotational energy to operate the hydraulic pump.

10. A hybrid powertrain comprising:
an internal combustion engine;
a transmission having:
- a transmission input member
- a transmission output member;
- a first, second, third and fourth planetary gear set each planetary gear set having a sun gear member, a ring gear member and a planet carrier member supporting a plurality of planet gears each configured to intermesh with both the sun gear member and the ring gear member, wherein the transmission input member is continuously interconnected with the planet carrier member of the second planetary gear set, and the transmission output member is continuously interconnected with the planet carrier member of the fourth planetary gear set and the planet carrier member of the third planetary gear set, and wherein the sun gear member of the first planetary gear set is continuously interconnected with the sun gear member of the second planetary gear set, the ring gear member of the second planetary gear set is continuously interconnected with the sun gear member of the third planetary gear set, the planet carrier member of the first planetary gear set is continuously interconnected with the ring gear member of the fourth planetary gear set;
- a first clutch selectively engageable to interconnect the sun gear member of the fourth planetary gear set to the planet carrier member of the second planetary gear set and the transmission input member;
- a second clutch selectively engageable to interconnect the sun gear member of the fourth planetary gear set to the sun gear member of the third planetary gear set and the ring gear member of the second planetary gear set;
- a third clutch selectively engageable to interconnect the sun gear member of the fourth planetary gear set to the ring gear member of the third planetary gear set;
- a first brake selectively engageable to interconnect the sun gear member of the first planetary gear set and the sun gear member of the second planetary gear set to the transmission housing;
- a second brake selectively engageable to interconnect the ring gear member of the first planetary gear set to the transmission housing; and
- wherein the clutches and brakes are selectively engageable to establish at least eight forward speed ratios and at least one reverse speed ratio between the transmission input member and the transmission output member;

an electric machine connected to the transmission input member between the internal combustion engine and the transmission;
a torque converter connected between the electric machine and the transmission for transmitting torque generated by one of the engine and the electric machine to the transmission input shaft;
a hydraulic pump coupled to the torque converter for receiving rotational energy from the torque converter and configured to generate oil pressure to control an operation of the transmission; and
an input member clutch for selectively coupling an engine output shaft of the internal combustion engine with the transmission input member.

11. The hybrid powertrain of claim 10 wherein the transmission further comprises a transmission housing having a first wall, a second wall, and a third wall extending between the first and second walls and wherein the first planetary gear set is adjacent the first wall, the second planetary gear set is adjacent the first planetary gear set, the fourth planetary gear set is adjacent the second wall, and the third planetary gear set is between the second and fourth planetary gear sets.

12. The hybrid powertrain of claim 11 wherein the transmission housing further comprises a first area defined radially inward from an outer periphery of the planetary gear sets and axially bounded by the first wall and the first planetary gear set, a second area defined radially inward from the outer periphery of the planetary gear sets and axially bounded by the first and second planetary gear sets, a third area defined radially inward from the outer periphery of the planetary gear sets and axially bounded by the second and third planetary gear sets, a fourth area defined radially inward from the outer periphery of the planetary gear sets and axially bounded by the third and fourth planetary gear sets, a fifth area defined radially inward from the outer periphery of the planetary gear sets and axially bounded by the fourth planetary gear set and the second wall, and a sixth area defined radially inward from the third wall and radially outward from the outer periphery of the planetary gear sets and axially bounded by the first wall and the second wall.

13. The hybrid powertrain of claim 12 wherein the first clutch is located in at least one of the third, fourth, and fifth areas, the second clutch is located in the fourth area, the third clutch is located in at least one of the fourth and sixth areas, the first brake is located in at least one of the first, fifth, and sixth areas, and the second brake is located in at least one of the first, fifth, and sixth areas.

14. The hybrid powertrain of claim 12 wherein the first clutch is located in the third area, the second clutch is located in the fourth area, the third clutch is located in the fourth area, the first brake is located in the sixth area and the second brake is located in the sixth area.

15. The hybrid powertrain of claim 10 further comprising a torsional vibration damper connected to the engine output shaft for reducing vibration in the engine output shaft.

16. The hybrid powertrain of claim 10 further comprising at least one torque sensor coupled to at least one of the engine output shaft, the transmission input shaft and the transmission output shaft for controlling torque transmission.

* * * * *